June 10, 1930.  W. A. MARRISON  1,762,725
METHOD OF AND MEANS FOR INDICATING SYNCHRONISM
Filed March 24, 1928
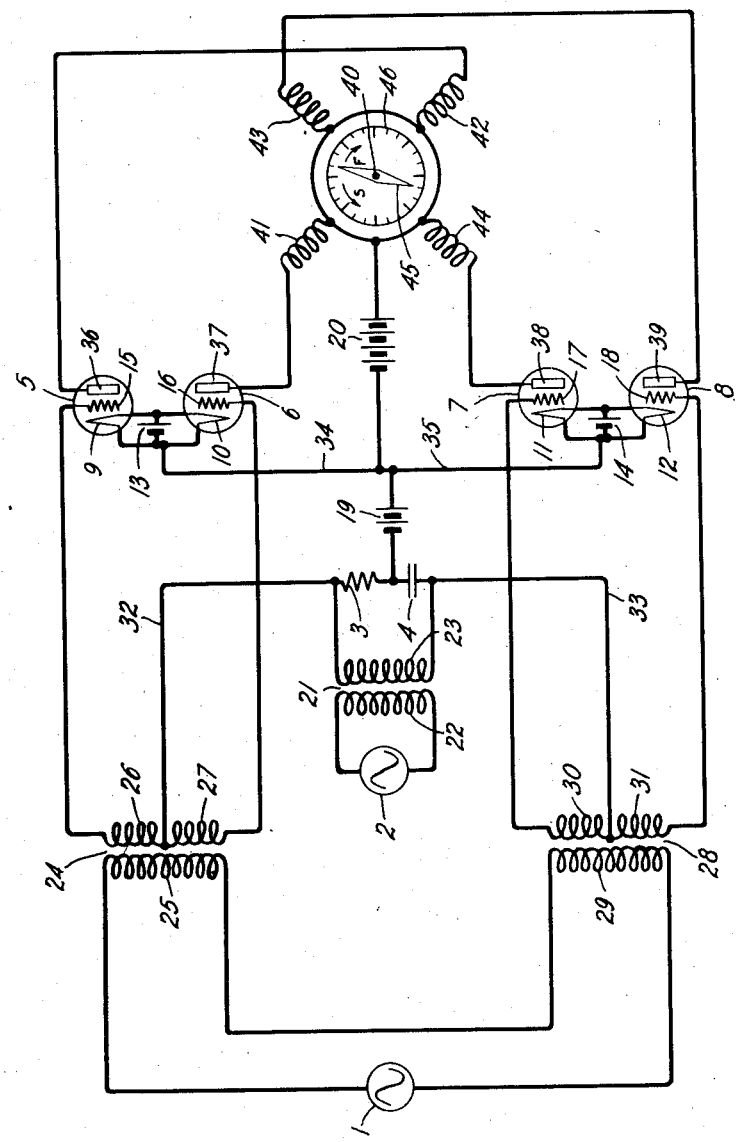
INVENTOR
WARREN A. MARRISON
BY J.P. Neville
ATTORNEY Patented June 10, 1930

1,762,725

UNITED STATES PATENT OFFICE

WARREN A. MARRISON, OF ORANGE, NEW JERSEY, ASSIGNOR TO BELL TELEPHONE LABORATORIES, INCORPORATED, OF NEW YORK, N. Y., A CORPORATION OF NEW YORK

METHOD OF AND MEANS FOR INDICATING SYNCHRONISM

Application filed March 24, 1928. Serial No. 264,431.

The invention relates to a method and means whereby the synchronous operation of a plurality of generators or other sources of electromotive forces, electric currents or electromagnetic waves, particularly of carrier or radio frequency, may be indicated.

Heretofore it has been the practice, particularly in power engineering, to use a synchroscope to indicate various relationships of electric waves, including, for example, the synchronous operation of alternating current sources, the relative values of the frequencies of a plurality of waves, i. e. which is higher and which lower, and the phase relationship of the waves.

Synchroscopes are ordinarily designed to be operated directly by the low frequency waves common in power engineering, viz, 25 or 60 cycles per second and are provided with stator and rotor windings to which are supplied alternating currents from the sources.

It has also been the practice to employ with a synchroscope, a phase-splitting network. However, these networks have only been required to function over a very small range of frequencies in the immediate vicinity of the power frequency.

In accordance with the present invention one of two waves to be compared is applied to a phase-converting network which operates to efficiently produce therefrom polyphase components the frequency of which may have any value within a considerable range. The polyphase components and the second wave are combined to produce polyphase low frequency components which are used to produce a rotating field which controls a rotor of magnetic material to indicate various relationships between the applied waves.

An object of the invention is to indicate the phase relationship between a plurality of waves.

Another object is to indicate synchronous operation of a plurality of alternating current sources.

Still another object is to indicate which of two applied waves is the higher in frequency.

A still further object is to directly transform waves supplied by separate carrier frequency sources into polyphase low frequency components.

A feature of the invention is the provision of a synchroscope including a rotor of magnetic material having no windings.

These and other features, objects and aspects of the invention will be apparent from the following description and the claims.

The single figure of the drawing is a diagrammatic representation of one specific embodiment of the invention.

The drawing shows the single phase sources 1 and 2 of electric waves for which it is desired to produce an indication of various relationships.

Impedance elements 3 and 4, which may be a resistance and a capacity, respectively, comprise a phase splitting network for converting the single phase waves from source 2 into a system of waves in phase quadrature.

Pairs of space discharge tubes 5, 6 and 7, 8 are connected in a suitable manner to function as two duplex modulating devices for combining waves from sources 1 and 2. The duplex modulators are of the type disclosed in U. S. Patent 1,343,307, June 15, 1920 to Carson. Cathodes 9, 10, 11 and 12, respectively, within the tubes are heated by current from batteries 13 and 14 connected as illustrated. Any other well known means may be employed for heating the cathodes. A biasing potential is supplied to the control electrodes 15, 16, 17 and 18 by battery 19. Space current for the tubes is supplied by battery 20.

Transformer 21, comprising primary winding 22 and secondary winding 23, is provided to supply waves from source 2 to elements 3 and 4. Transformers 24 and 28, comprising primary windings 25 and 29 and secondary windings 26, 27 and 30, 31, serve as input transformers for the duplex modulators 5, 6 and 7, 8.

Waves from source 1, impressed upon windings 25 and 29, are induced in the secondary windings 26 and 27 and are impressed upon electrodes 15, 9, 10 and 16 in series. Waves from source 1 are likewise induced in the windings 30 and 31 and impressed upon electrodes 17, 11, 12 and 18 in series. By this means, waves from source 1 are supplied serially to modulator tubes 5 and 6 and also serially to modulator tubes 7 and 8.

Of the two quadrature phased waves developed in the elements 3 and 4, respectively, and derived from source 2, one wave is applied to tubes 5 and 6 in parallel through circuits comprising element 3 and conductor 32, in common, windings 26 and 27 in parallel, space discharge paths 15, 9, and 16, 10, in parallel, and conductor 34 and battery 19, in common. The other wave is applied to tubes 7 and 8 in parallel through circuits comprising element 4 and conductor 33, in common, windings 30 and 31, in parallel, space discharge paths 17, 11 and 18, 12 in parallel, and conductor 35 and battery 19, in common.

Duplex modulator 5, 6 generates, among other modulation products, a pair of electromotive forces having a frequency equal to the difference between the frequencies of sources 1 and 2. These electromotive forces combine in phase with each other and produce a current through a circuit comprising electrodes 36, 9, 10 and 37, and a pair of coaxial coils 41 and 42.

Duplex modulator 7, 8 likewise generates a pair of electromotive forces having the difference frequency. The electromotive forces generated in modulator 7, 8 combine in phase with each other to produce a current through the circuit comprising electrodes 38, 11, 12 and 39, and a second pair of coaxial coils 43 and 44.

It is inherent in the operation of the above described combination of duplex modulators that when quarter phase waves are applied, in the manner set forth, certain of the modulation products likewise appear in phase quadrature. The difference frequency components in the two duplex modulators do, in point of fact, appear in phase quadrature by reason of this inherent property of the system.

Coils 41 and 42 are mounted with their common axis perpendicular to that of coils 43 and 44.

A rotor in the form of vane 45 composed of magnetizable material is arranged to have freedom of rotation about intersection 40 of the axes of the coils.

Vane 45 may be pivoted at point 40 or it may be floated on the surface of a liquid with low surface tension, e. g. alcohol, to provide suitable damping for the motion, or other suitable means of mounting may be used. A scale 46 of any desired type may be provided for measuring angular deflections of the vane.

When waves of different frequencies are generated by sources 1 and 2, the action of the system is such as to make vane 45 rotate at an angular speed equal to one revolution per cycle of the difference frequency.

If it is desired to synchronize sources 1 and 2 the frequency of one source, preferably source 1, may be adjusted until vane 45 comes to rest, which condition indicates that sources 1 and 2 are identical in frequency.

At synchronism, or in case of small departures therefrom, the phase relationship between the electromotive forces generated by sources 1 and 2 may be ascertained by observing the deflection of vane 45 by means of the scale 46. The scale may be divided into degrees or other suitable units.

The zero reference point on the scale may be determined by controlling sources 1 and 2, to supply waves identical in frequency and having a predetermined phase relationship. It will be noted that degrees of circular measure on the scale correspond directly to electrical degrees of phase difference.

To indicate which of two waves is the higher in frequency it is only necessary to note the direction of rotation of the vane. By experimental means or otherwise it is possible to determine once and for all the direction of rotation corresponding to the condition of source 1 higher in frequency than source 2 and vice versa. For example, the scale may be marked with arrows S and F as indicated in the figure. Rotation in direction S may indicate that the alternations of the source 1, which may be an unknown source, are slower than those of source 2, which may be a standard source and rotation in the direction F, that the unknown is faster.

While the load circuit for the low frequency output two-phase waves in quadrature has been illustrated by the system of coils 41, 42, 43, 44, vane 45, and scale 46, arranged for effecting an indication, it will be evident that the system provides a source of two-phase currents which may be supplied to any suitable load circuit and used for any desired purpose.

When sources 1 and 2 are operated at frequencies much above the range of frequencies commonly employed in power engineering, there is a distinct advantage in making the phase transformation at the high frequency.

It is evidently desirable that the flux produced by coils 41 and 42 be approximately equal in magnitude to the flux produced by coils 43 and 44 so that the rotary motion of the vane 45 may be uniform. To effect this result equal voltages should be generated across elements 3 and 4, assuming the remainder of the system to be well balanced. This condition is easily assured for any given frequency of source 2. The condition will also be approximately fulfilled for a wide range of frequencies adjacent to a given high frequency, for within such range the percentage variation of frequency of the high frequency current is comparatively small and hence the percentage change in the voltage drop across the condenser 4 is negligible. At ordinary power frequencies this same frequency range of approximate adjustment is proportionately narrower.

What is claimed is:

1. A system comprising a plurality of sources of single phase alternating currents, means jointly controlled by said single phase currents to produce polyphase currents, and means actuated by said polyphase currents for indicating the phase relationship between said single phase currents.

2. A system comprising a plurality of sources of single phase alternating current of different frequencies, means jointly controlled by said single phase currents to produce a system of currents having distinct components separated by a phase angle which differs materially from 180°, and means for translating the frequency of said polyphase current components to the difference frequency of said single phase currents.

3. A method of indicating synchronism of a plurality of single phase alternating currents which comprises converting a portion of the single phase currents into polyphase currents, and controlling an indicator by the cooperative action of said polyphase currents.

4. A device for indicating the phase relationship of a plurality of single phase alternating currents comprising means to convert one of said single phase currents into a system of polyphase currents, a plurality of frequency translating devices controlled jointly by said polyphase currents and a second single phase current to produce polyphase currents of another frequency, and indicating means actuated by said polyphase currents of translated frequency.

5. The method of indicating phase relationships between a plurality of single phase alternating currents which comprises converting one of said single phase currents into a polyphase current system, translating the frequency of said system by modulation of said polyphase currents with a second single phase current and utilizing the frequency translated system to effect an indication.

6. A high frequency synchroscope comprising a plurality of duplex translating devices, series and parallel input circuits for each of said devices, means for impressing an alternating electromotive force upon each of said series input circuits, a resistance in one of said parallel input circuits, a condenser in the other parallel input circuit, means for impressing a second alternating electromotive force upon said resistance and condenser, output circuits for each of said translating devices, a quarter phase system of electromagnetic field coils included in said output circuits, a magnetizable vane adapted to be rotated by the field of said coils and a scale for indicating deflections of said vane.

7. A method of indicating phase relationships among the plurality of single phase carrier currents, which comprises converting one of said currents into two quarter phase currents, translating the frequency of said quarter phase currents by modulation with a second single phase current, producing a rotating magnetic field by combining the respective magnetic effects produced by the currents resulting from said frequency translation, and indicating the angular position of the resultant magnetic field.

In witness whereof, I hereunto subscribe my name this 22d day of March, 1928.

WARREN A. MARRISON.